(12) United States Patent
Pilkerton et al.

(10) Patent No.: US 6,694,005 B1
(45) Date of Patent: Feb. 17, 2004

(54) REMOTE TELEPHONE NUMBER ROUTING INVENTORY

(75) Inventors: Michael G. Pilkerton, Fairfax, VA (US); Donald C. Ryder, Manassas, VA (US)

(73) Assignee: Verizon Services Corp., Arlington, VA (US)

( * ) Notice: Subject to any disclaimer, the term of this patent is extended or adjusted under 35 U.S.C. 154(b) by 0 days.

(21) Appl. No.: 09/309,514

(22) Filed: May 11, 1999

(51) Int. Cl.[7] .............................. H04M 7/00; H04M 3/42
(52) U.S. Cl. .............................. 379/220.01; 379/211.02; 370/522
(58) Field of Search .................... 370/522; 379/219, 379/220.01, 211.02

(56) References Cited

U.S. PATENT DOCUMENTS

| | | | | |
|---|---|---|---|---|
| RE28,607 E | * | 11/1975 | Richards | 379/219 |
| 5,440,626 A | * | 8/1995 | Boyle et al. | 379/219 |
| 6,097,802 A | * | 8/2000 | Fleischer, III et al. | 379/211.02 |
| 6,175,574 B1 | * | 1/2001 | Lewis | 370/522 |
| 6,411,699 B1 | * | 6/2002 | Fleischer, III et al. | 379/211.02 |

* cited by examiner

Primary Examiner—Jack Chiang
Assistant Examiner—Thjuan P Knowlin
(74) Attorney, Agent, or Firm—Leonard C. Suchyta, Esq.; Joseph V Coppola, Esq.

(57) ABSTRACT

Telephone number translations and other data, such as class of service, that heretofore resided in end offices are relocated to one or more locations remote from the switches. Such locations may contain Integrated Service Control Points (ISCPs), or processing systems of like capacity, that are accessible through the SS7 network to the central office switches that serve calling subscribers. Translation tables that relate exchange codes to point codes, as well as triggers for routing to ported numbers, thus are not set individually in each central office. Information for each new service is loaded only into a single, or relatively few, centrally located databases rather than at each switch.

17 Claims, 6 Drawing Sheets

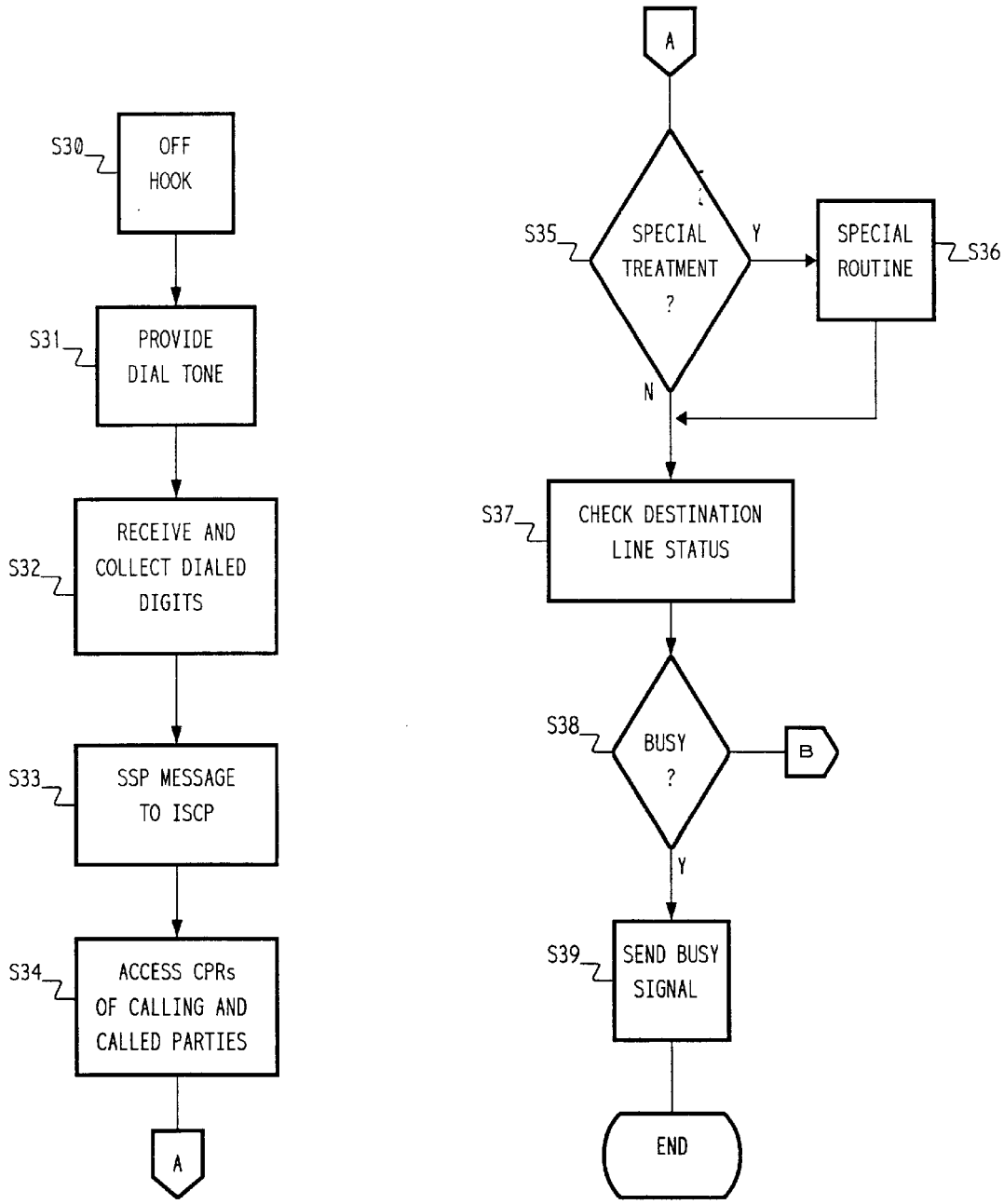

REMOTE TELEPHONE NUMBER ROUTING INVENTORY

TECHNICAL FIELD

The present invention relates to telephone call processing, more particularly to the translation of a dialed telephone number for routing a tall to the appropriate switching facility tat serves the called station.

BACKGROUND OF THE INVENTION

The public switched telephone network (PSTN) comprises multiple switching offices that require signaling between the offices for processing telephone calls. Signaling functions include transmitting routing and destination information transmitting alerting messages such as to indicate the arrival of an incoming call, and transmitting supervisor information, e.g. relating to line status. Signaling between offices can use 'in-band' transport or 'out-of-band' transport.

In-band signaling utilizes the same channel that carries the communications of the parties. In a voice telephone system one of the common forms of in-band signaling between offices utilizes multi-frequency signaling over voice trunk circuits. The same voice trunk circuits also carry the actual voice traffic between switching offices. In-band signaling, however, tends to be relatively slow and ties up full voice channels during the signaling operations. In telephone call processing, a substantial percentage of all calls go unanswered because the destination station is busy. For in-band signaling, the trunk to the end office switching system serving the destination is set-up and maintained for the duration of signaling until that office informs the originating office of the busy line condition. In-band signaling thus adds to congestion in the voice channels of the telephone network. In-band signaling also is susceptible to fraud by hackers who have developed devices which mimic in-band signaling.

Out-of-band signaling has evolved to mitigate the problems of in-band signaling. Out-of-band signaling utilizes separate channels, and in many cases separate switching elements, thereby alleviating communication channel congestion. As out-of-band signaling utilizes its own signal formats and protocols, unconstrained by protocols and formats utilized for the actual communication, it is considerably faster than in-band signaling. All end user communications remain in-band, making it virtually impossible for an end user hacker to simulate signaling messages which ride on an out-of-band channel or network.

Out of band signaling telephone networks include data links in one or more packet switching systems, known collectively as the Common Channel Signaling (CCS) or Common Channel Interoffice Signaling (CCIS) system. This system typically uses signaling system 7 (SS7) protocol. An SS7 compliant CCIS network comprises data switching systems designated Signal Transfer Points (STPs) and data links between the STPs and various telephone switching offices of the network. In advanced versions of the telephone network including high level control nodes, identified as Service Control Points (SCPs) or Integrated Service Control Points (ISCPs , the CCIS network also includes data links connecting the high level control nodes to one or more of the STPs.

Each central office in the PSTN is assigned an area code (NPA) and exchange code (NXX) in accordance with the North American Number Plan (NANP). From the range of ten digit telephone numbers available with an NPA-NXX code, the subscriber at any particular station is assigned a ten-digit telephone number (NPA-NXX-XXXX). Central office switching systems typically include a programmable digital switch with CCIS communications capabilities. One example of such a switch is a 5ESS type switch manufactured by AT&T. Other vendors, such as Northern Telecom and Siemens, manufacture comparable digital switches.

The STPs are program controlled packet data switching systems that facilitate routing of calls. In call routing operation, an STP will receive a packet data message from another node of the network, for example from an end office switching system. The STP analyzes point code information in the packet and routes the packet according to a translation table stored within the STP. This translation table is static. Any packet having a particular point code is output on a port going to the next CCIS signaling node specified by translation of that point code. The point code information received by an STP may be generated by a call originating office switch, such as the aforementioned 5ESS type switch. Each switching office facility contains translation tables by which dialed digits received from a calling station is converted to the appropriate point code. It can be appreciated that the complexity and "intelligence" capability required of central office switches continue to increase as switch functionality expands.

The advent of open competition among service providers of local telephone services, which have their own independent switching facilities integrated into the public switched telephone network, imposes even greater demands on the network switches. Telephone subscribers who change their local service providers must be afforded the opportunity to retain their previously assigned ten-digit telephone number so that change in service can occur in a seamless manner from the user's perspective. The scope of telephone number portability may be extended further, for example, to permit a user to keep the same telephone number at the same or different location, while terminating service from one provider in favor of a new service provider, and moving from plain old telephone service (POTS) to integrated digital services network (ISDN). While an actual change of connections at the same or different premises by a technician will permit customer off-hook to draw dial tone for calling out, the ability to receive incoming calls is not so easily effected. The network must be capable of routing calls dialed to the same subscriber's number through the changed facilities. Conventional call processing methods would require that the appropriate routing identification information for any active telephone number be accessible to the originating switch associated with a calling party of a ported number call. The "porting" of an active telephone number from one central office switching facility to another renders obsolete the NXX translation previously stored for that number at each switch in the network. Whether updated information will be stored at each switch or at a remote location in the network, the involvement and complexity of central office switches will be increased if call processing will occur according to current methodology. Current practice would require a change at each network switch each time new ported number service for any subscriber is to take effect.

Such change would involve either ah update in the storage in each switch of the changed translation or, at least, the setting of an appropriate trigger to obtain the information from a remote database location. Reference is made to commonly assigned copending U.S. patent application Ser. No. 09/053,678, filed Apr. 2, 1998, entitled LOCAL NUMBER PORTABILITY SERVICE SAVER for a more detailed description of aspects of telephone number portability.

Aside from the disadvantages associated with increased switch complexity, the need to make changes at each network switch whenever a new ported telephone number subscription takes place, imposes significant burden on the ability to maintain seamless service. Additional complexities are involved in the provision of accurate billing records, which are normally determined by rate tables for specific central offices that are associated with NXX exchange codes.

DISCLOSURE OF THE INVENTION

The present invention avoids the drawbacks and disadvantages described above, in part by relocating telephone number translations and other data, such as class of service, that heretofore resided in central offices to one or more locations remote from the switches. Such locations may contain Integrated Service Control Points (ISCPs), or processing systems of like capacity, that are accessible through the SS7 network to the central office switches that serve calling subscribers.

An advantage of the present invention is that translation tables that relate exchange codes to point codes, as well as triggers for routing to ported numbers, need not be set individually in each central office. Information for each new service in accordance with the invention can be loaded only into a single, or relatively few, centrally located databases rather than at each switch.

In another aspect of the invention, the central office equipment identifier for each ten digit number, such as the line equipment number (LEN), can be stored in the remote database. Consequently, network management can be handled by the ISCP or the like device for both line control and trunk control.

A further advantage of the present invention is that off-hook triggers can be set uniformly at all central offices for all originating calls. Once set, no further trigger updating is required each time an individual change in service for a subscriber line occurs thereafter. All information necessary for processing any call may be accessed routinely by each switch via the SS7 network from the remote location. The need for various complex trigger mechanisms, such as terminating triggers, and continual updating thereof, will be eliminated. Each network switch thus can be simplified. With substantially all the data and "intelligence" removed from the switch, the central office can thus take on the appearance of a station address, per se.

Another advantageous aspect of the present invention is that billing rate tables may be assigned individually to phone numbers, rather than NXXs in serving central offices. Thus billing records can be developed for all calls at the location removed from the central office by application of the rate tables and accumulation of call time at the removed location.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

Reference is made to the attached drawings, wherein elements having the same reference numeral designations represent like elements throughout and wherein:

FIGS. 4a–4c taken together form a simplified process flow diagram illustrative of call processing and routing of calls in accordance with the present invention.

DESCRIPTION OF THE PREFERRED EMBODIMENTS

Figure 1:
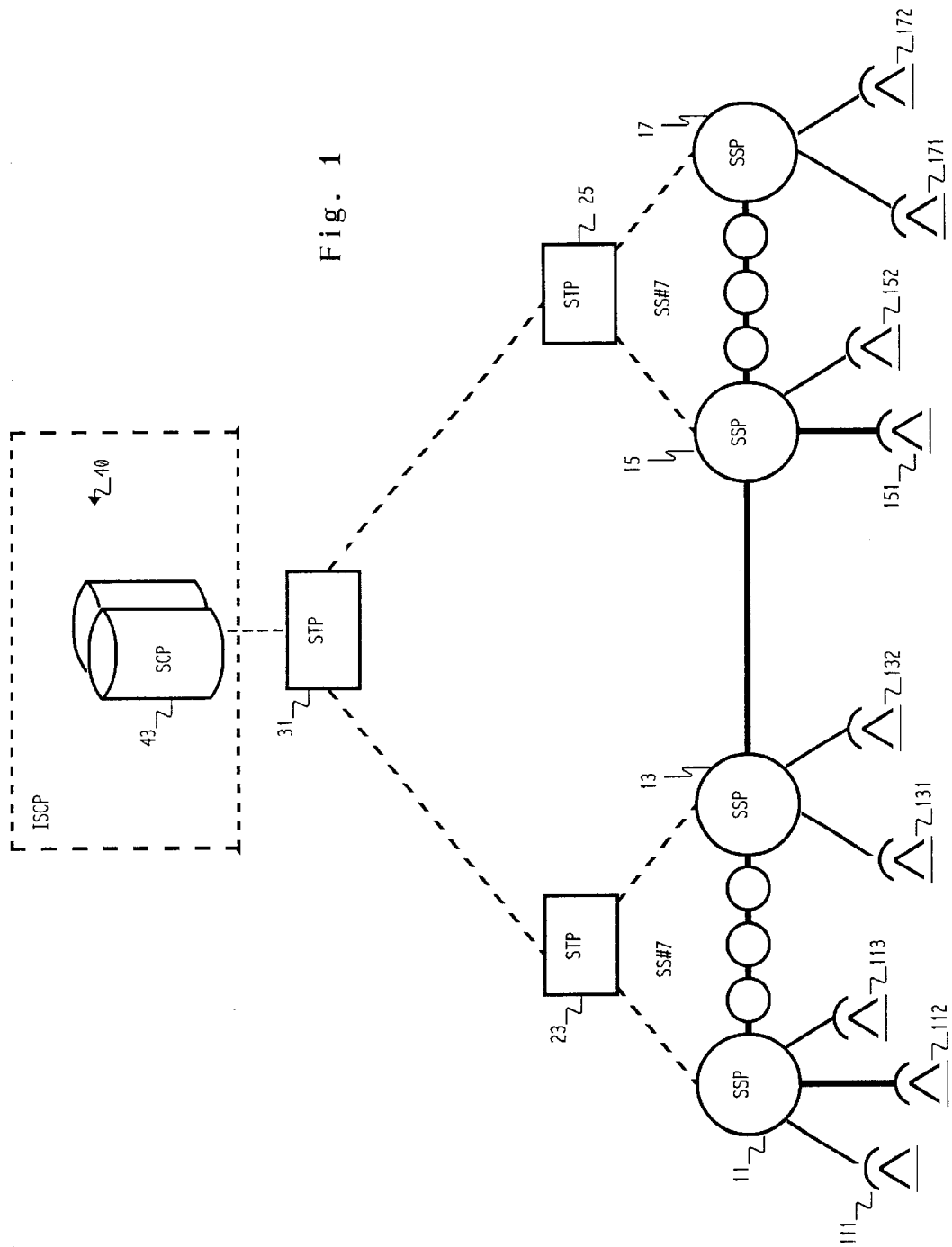
FIG. 1 is a simplified diagram of a public switched telephone network that embodies switching facilities in an advanced intelligent network (AIN) that is applicable to the present invention.

FIG. 1 is a simplified diagram of a public switched telephone network that embodies switching facilities in an advanced intelligent network (AIN) that is applicable to the present invention. In an AIN system, central offices (CO's) having service switching points (SSPs) exchange data messages with an integrated services control point (ISCP) via one or more switching transfer points (STPs). At least some calls are thus controlled through multiple central office switches using data retrieved from a database in the ISCP. The SSPs, STPs and ISCPs are elements of a common channeling signaling network that uses SS7 protocol in out of band signaling paths separate from the paths used for voice transmission. It will be recognized, of course, that FIG. 1 is considerably simplified for explanation purposes and that the full network and operating environment for the invention may comprise multiple central offices, diverse interconnections, and provisions for reliability through redundancy, not all of which need be shown for developing an understanding of the invention. For a more detailed description of an AIN system, suitable for implementation in connection with the present invention, reference is made to U.S. Pat. No. 5,247,571 to Kay and McConnell, the disclosure of which is incorporated herein by reference. The Kay and McConnell patent is assigned to the assignee of the present invention.

All of the CO's 11, 13, 15 and 17 are equipped and programmed to serve as SSPs. The SSPs 11 and 13 connect to a first local area STP 23, and the SSPs 15 and 17 connect to a second local area STP 25. The connections to the STPs are for signalling purposes. Each local area STP can connect to a large number of SSPs. Although not shown, the central offices or SSPs are interconnected to each other by trunk circuits for carrying telephone services.

The local area STPs 23 and 25, and any number of other such local area STPs, may communicate with an STP 31 associated directly with an ISCP 40 to serve the entire area. The STP hierarchy can be expanded or contracted to as many levels as needed appropriately to serve subscriber demand. The links between the CO's and the local area STPs are dedicated CCIS links, typically SS7 type interoffice data communication channels. The local area STPs are in turn connected to each other and to the regional STP 31 via a packet switched network. The regional STP 31 also communicates with the ISCP 40 via a packet switched network.

Control logic and feature data are located at SCP 43. SSPs communicate with the SCP through the associated STP. If a call requires a feature service such as call redirection, an SSP is triggered to communicate with the SCP on the basis of the call characteristics, such as originating line or dialed digits. If a trigger occurs, a query message is initiated by the SSP switch and sent to the SCP to obtain instructions. The SCP, if provided with appropriate data base storage and processing capability, can determine the nature of the service and information appropriate to routing of the call. Redirection of the call can be signaled through the STP(s) to seize a trunk circuit between the originating CO and the redirected destination CO.

Figure 2:
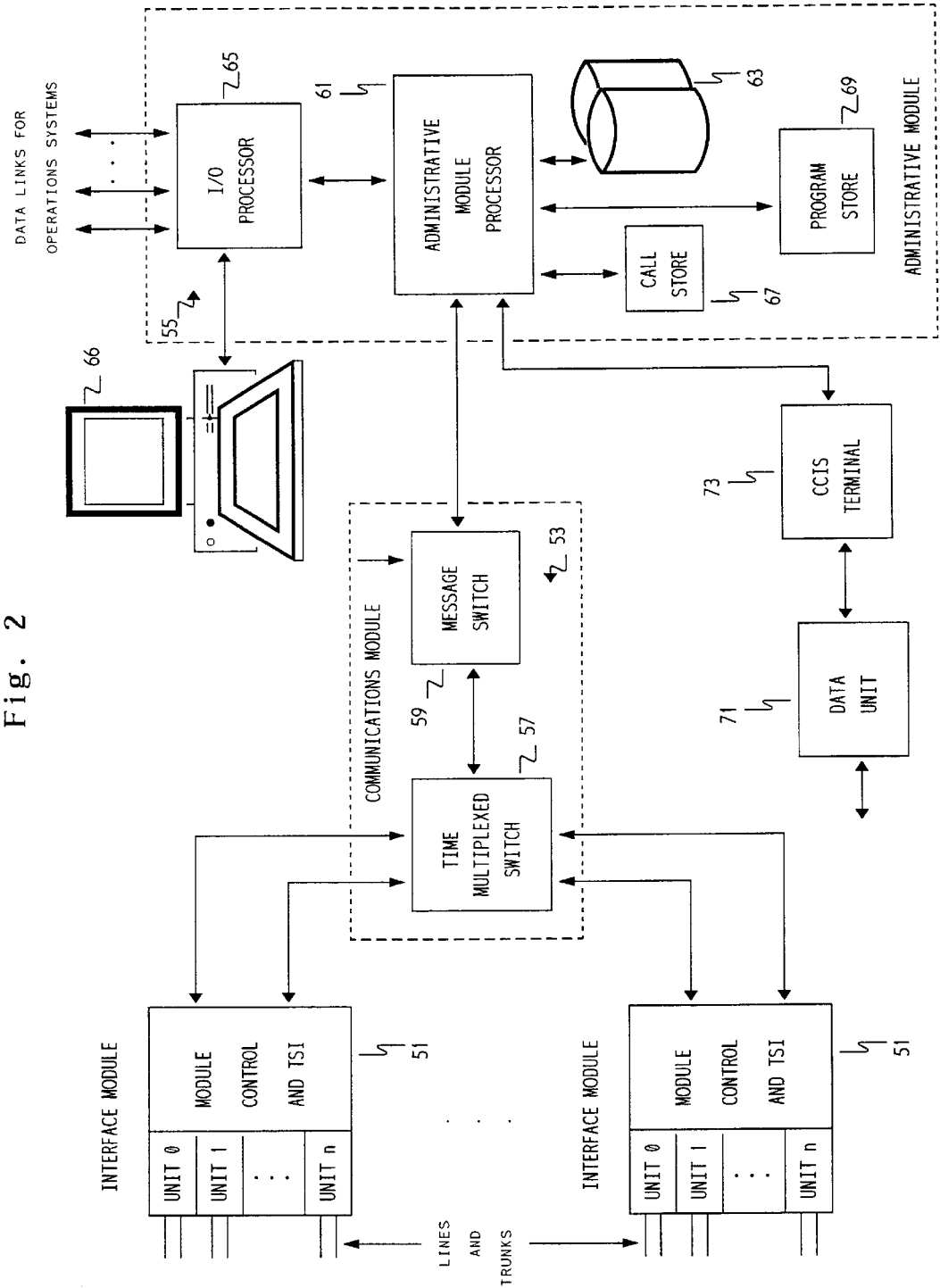
FIG. 2 is a simplified block diagram of an electronic program controlled switch which may be used as any one of the SSP type CO's in the system of FIG. 1.

FIG. 2 is a simplified block diagram of an electronic program controlled switch which may be used as any one of the SSP type CO's in the system of FIG. 1. As illustrated, the CO switch includes a number of different types of modules. In particular, the illustrated switch includes interface modules 51 (only two of which are shown), a communications module 53 and an administrative module 55.

Each of the interface modules 51 includes a number of interface units 0 to n. The interface units terminate lines from subscribers' stations, trunks, T1 carrier facilities, etc., that are physically wired to a main distribution frame (not shown) in the central office. Where the interfaced circuit is analog, for example a subscriber loop, the interface unit will provide analog to digital conversion and digital to analog conversion. Alternatively, the lines or trunks may use digital protocols such as T1 or ISDN. Each interface module 51 also includes a digital service unit (not shown) which is used to generate call progress tones.

Each interface module 51 additionally includes a duplex microprocessor based module controller and a duplex time slot interchange, referred to as TSI in the drawing. Digital words representative of voice information are transferred in two directions between interface units via the time slot interchange (intramodule call connections) or transmitted in two directions through the network control and timing links to the time multiplexed switch 57 and thence to another interface module (intermodule call connection).

The communication module 53 includes the time multiplexed switch 57 and a message switch 59. The time multiplexed switch 57 provides time division transfer of digital voice data packets between voice channels of the interface modules 51 and transfers data messages between the interface modules. The message switch 59 interfaces the administrative module 55 to the time multiplexed switch 57, so as to provide a route through the time multiplexed switch permitting two-way transfer of control related messages between the interface modules 51 and the administrative module 55. In addition, the message switch 59 terminates special data links, for example, a link for receiving a synchronization carrier used to maintain digital synchronism.

The administrative module 55 includes an administrative module processor 61, which is a computer equipped with disc storage 63, for overall control of CO operations. The administrative module processor 61 communicates with the interface modules 51 through the communication module 53. The administrative module 55 also includes one or more input/output (I/O) processors 65 that provide interfaces to terminal devices for technicians such as shown at 66 in the drawing and data links to operations systems for traffic, billing, maintenance data, etc. A CCIS terminal 73 and an associated data unit 71 provide a signalling link between the administrative module processor 61 and an SS#7 network connection to an STP or the like, as shown in FIG. 1, for facilitating call processing signal communications with other COs and with the ISCP 40.

The administrative module 55 also includes a call store 67 and a program store 69. Although separately shown for convenience, these elements are typically implemented as memory within the computer serving as the administrative module processor 61. For each call in progress, the call store 67 stores translation information retrieved from disc storage 63 together with routing information and any temporary information needed for processing the call. For example, for a switch based Centrex type service, the call store 67 would receive and store extension number translation information for the business customer corresponding to an off-hook line initiating a call. Translation tables, including subscribed class features are loaded into the store with each call. The program store 69 stores program instructions which direct operations of the computer serving as the administrative module processor.

The central office switching facilities, having evolved to its current high degree of storage capacity and processing capability, currently handle routine calls without resort to the ISCP. Call routing and processing proficiency, the ability to time calls and provide billing information, are all functions built in to the switches. The central office switches store not only NXX routing translation tables but also billing rate tables associated with destination NXX's according to a rate theorem. The ISCP is accessed conventionally only to handle special situation calls wherein additional information must be delivered to the switch from an external source, either the ISCP itself or a peripheral device, in order to complete the call processing.

Figure 3A:
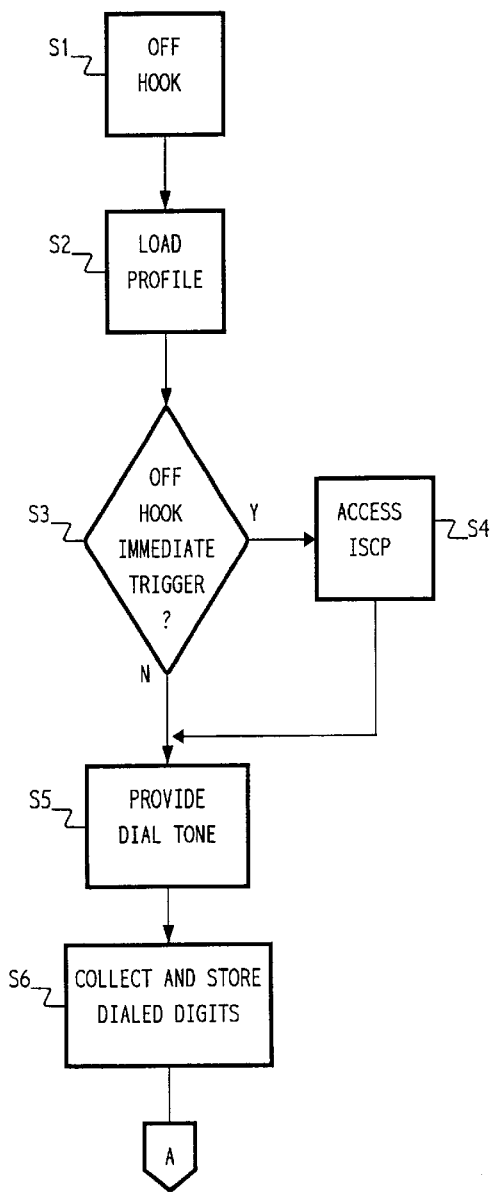
FIGS. 3a–3c taken together form a simplified process flow diagram illustrative of typical call processing and routing of calls in the current AIN network.
Figure 3B:
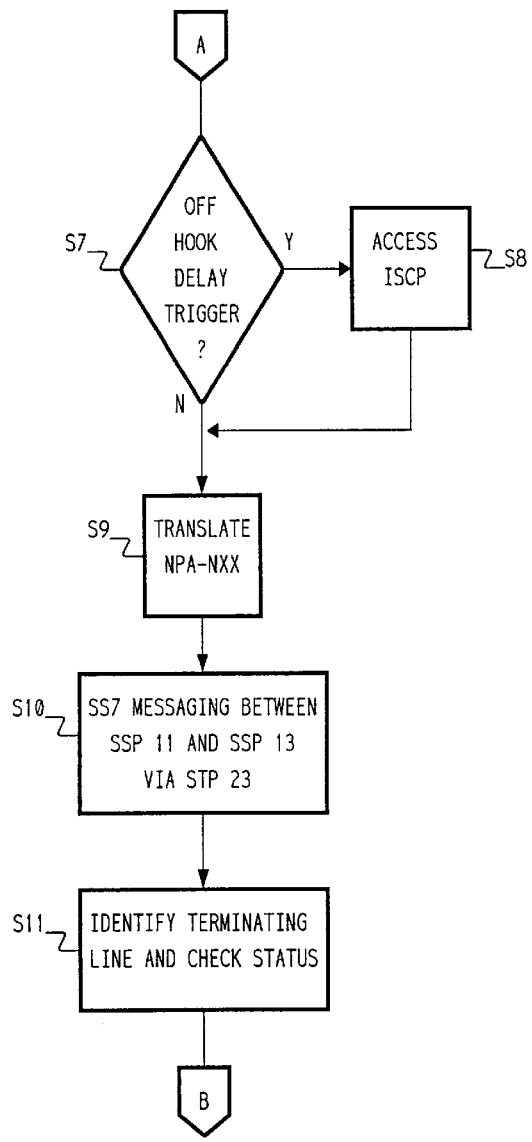
Figure 3C:
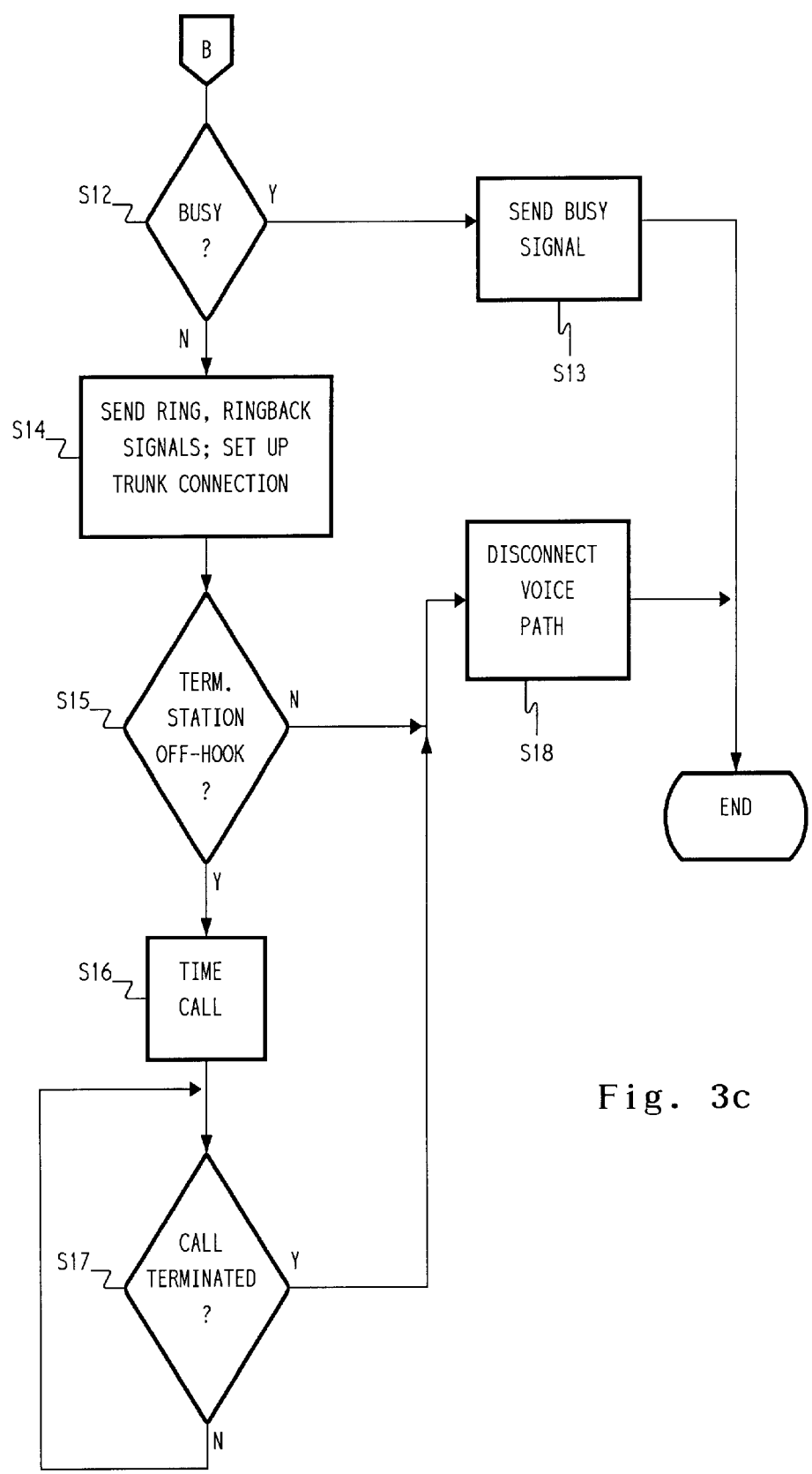

FIGS. 3a–3c taken together form a simplified process flow diagram illustrative of typical call processing and routing of calls in the current AIN network. As an example, it is assumed that a caller at station 111 places a call to station 131. The caller lifts the handset creating an off-hook state in the telephone 111 and a corresponding signal or change in state on the line to the central office 11 (step S1). The caller's line is identified with line equipment in the central office, the off-hook signal being taken as a request to make an outgoing call. The serving central office 11 detects the off-hook and assigns a register in the call store 67 to this call. Profile information associated with the off-hook line is loaded from the disc storage 63 into the assigned register (step S2). The profile may or may not include the setting of a trigger, such as an off-hook immediate or delay trigger, which would be effective to suspend processing in the central office while the ISCP is accessed for further information. Such a trigger is set as an indication that the call is not simply to be completed to the dialed number destination in routine fashion. If an immediate off-hook trigger is set, as determined at step S3, the call process is suspended while any appropriate interaction with the ISCP takes place (step S4). The ISCP, for example, may provide information obtained from the stored call processing record of the subscriber calling line to the originating SSP 11 with respect to call restrictions or special treatment. Thereafter, or if no immediate off-hook trigger has been set as determined in step S2, the switch sends a dial tone signal on the caller's line (step S5). The caller can then dial in the digits corresponding to the telephone number assigned to the called station 131. For example, this number (NPA-NXX-XXXX) may be 703-305-4720. At step S6, the dialed digits are received and stored in the register at the SSP 11. While the NPA, 703, need not be dialed for a local call, the switch translation table can identify the destination switching office NXX by either the ten digit or seven digit caller input.

If a delayed off-hook trigger has been set, as determined at step S7, interaction with the ISCP occurs (step S8), whereby the SSP switch may receive the routing destination information either from the received dialed digits directly or from the ISCP. Thereafter, or if no off-hook delay trigger has been set as determined in step S7, the switch, using its translation table for the NXX "305" associated with SSP 13 (step S9), then provides the destination code in an SS7 protocol message sent to the STP 23. The message is relayed, through any additional STP if necessary, to the destination SSP 13 (step S10). The message will include identification of the last four digits of the called telephone number. SSP 13 identifies the terminating line associated with those digits (step S11) and checks its busy/idle status (step S12). If the called line is determined to be busy, this information is sent through the SS7 network to the originating office SSP11, which sends a busy signal over the calling line (step S13). The caller will then go back on-hook to end the process. It is assumed, for the purpose of forgoing explanation not needed for the present invention, that no voice mail forwarding option or other special treatment is assigned to calls to busy destinations.

If the called line is determined to be idle (step S12), a ringing signal is applied to the terminating station 131 line, while a trunk connection path is set up between the originating SSP 11 and terminating SSP 13, via the STP 23 and the SS7 network, and a ringback signal is provided to originating station 111 line (step S14). If an off-hook condition is determined at the terminating station (step S15), the originating SSP 11 will time the call until completion, to develop a billing record (step S16). Upon termination of the call by a return to on-hook condition as determined at step S17, the voice path, including the trunk connection, is disconnected (step S18). If no off-hook condition has been determined within a set period at step S15, termination of the connection will occur at step S18.

To perform routing as described in the above example, every originating office must have a translating table that has every NXX within a local area that will be translated within the three or six digit (NPA-NXX) translator. With telephone number portability, the NXX numbers no longer will all be mutually exclusive to respective terminating offices. That is, telephone numbers having the same NXX digits will be assigned to subscriber lines served by different terminating offices. For example, in the above illustration, the telephone number 703-305-4720 that has been served by SSP 13 in Arlington, Va. may be ported to station 151, served by SSP 15 that may be located in Clinton, Md. As an alternative example, the same telephone number may remain assigned to station 131, which may have had a change in service to a competing CLEC switching facility. Some update must take place at every originating switching office in the network for such changes in order to avoid routing of calls placed for that telephone number to the original switching office associated therewith.

Figure 4C:
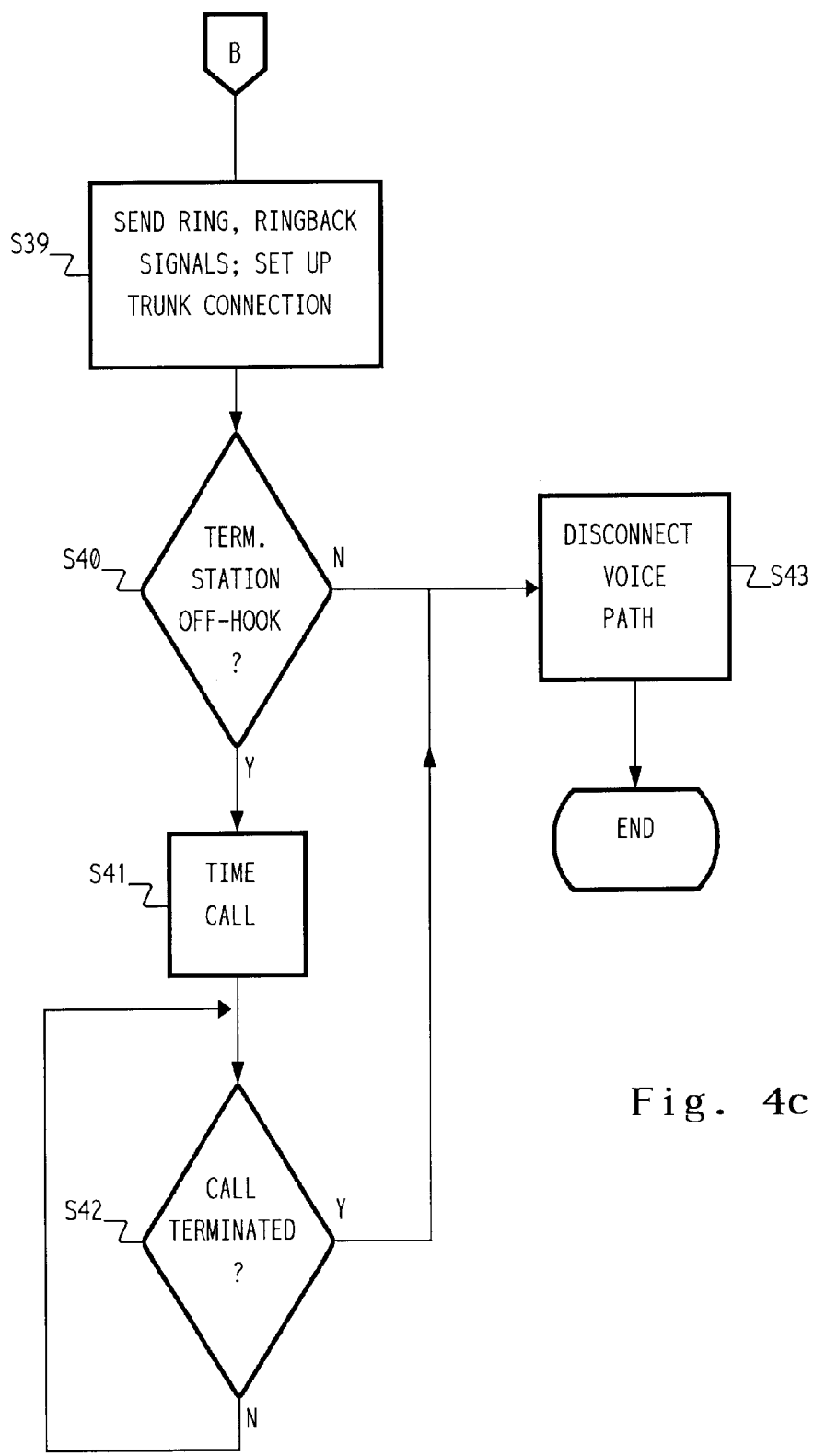

FIGS. 4a–4c taken together form a simplified process flow diagram illustrative of call processing and routing of calls in accordance with the present invention. It is again assumed, as an illustrative example, that a caller at station 111 (FIG. 1) places a call to station 131. The caller lifts the handset creating an off-hook state in the telephone 111 and a corresponding signal or change in state on the line to the central office 11 (step S30) The central office 11 identifies the caller's line with its line equipment while the off-hook signal is detected and taken as a request to make an outgoing call. The serving central office provides the dial tone signal on the caller's line (step S31). The dialed digits input by the caller are received as signals at the switching office and collected (step S32). SSP 11 then sends a data message via the STPs 23 and 31 in the SS7 network to the ISCP 40 (step S33). This message includes the station address, i.e., identification of the equipment in the central office that is connected to the calling line, and the dialed digits. As an example, the station address may be the line equipment number.

From the information received in the data message, the ISCP identifies the calling and called subscriber call processing records (CPRs), which may be stored therein or at an adjunct location. In accordance with the present invention, the class of service information for the calling party subscriber also is stored at the ISCP rather than the conventional switching office location. The CPR records are accessed (step S34) and, from the information obtained therefrom and the class of service information, determination is made at step S35 whether special processing is required. For example, any of various restrictions may be in place for the calling line based on destination dialed, time of day, day of week, etc. Other applications may involve voice or DTMF caller input interaction with the ISCP in order to define the ultimate number destination or type of restriction. The called party CPR, similarly, may have a call forwarding or timed-do-not-disturb feature or the like. If it is determined at step S35 that other than a standard call to the dialed number is to be completed, the ISCP will perform the appropriate processing at step S36. As the details of any special call treatment of this nature would be known to those practitioners skilled in the art and therefore not necessary for an explanation of the present invention, it is assumed that as a result of step S36 there is obtained, without further restriction, a translation of the destination address that may or may not be the same as the dialed destination translation.

Thereafter, or if it is determined at step S35 that no special treatment by the ISCP is required, the ISCP will send a data message to the STP 23 to check the idle/busy status of the destination line (step S37). The called line is determined to be busy (step S38), this information is sent through the SS7 network to the originating office SSP11, which sends a busy signal over the calling line (step S39). The caller will then go back on-hook to end the process. It is again assumed that no voice mail forwarding option or other special treatment is assigned to calls to busy destinations.

If the called line is determined to be idle (step S38), a ringing signal is applied to the terminating station 131 line, while a trunk connection path is set up between the originating SSP 11 and terminating SSP 13, via the STP 23 and the SS7 network, and a ringback signal is provided to originating station 111 line (step S39). If an off-hook condition is determined at the terminating station (step S40), a message is sent to ISCP 40 to begin timing the call (step S41). The status of the call is continually monitored until it is determined at step S42 that the call has been terminated by a return to on-hook condition. The voice path, including the trunk connection, is disconnected and a message sent to the ISCP to complete timing of the call (step S43). If no off-hook condition has been determined within a set period at step S40, termination of the connection will occur at step S43.

It is to be understood that the ISCP is one of several alternative devices that may be used in the illustrative implementation. An intelligent peripheral device or other equivalent apparatus may be used in conjunction with, or in place of, the ISCP. The term "ISCP" thus has been used in the above description in this broader sense. Moreover, as the present invention transfers much of the call processing functionalities from the central offices to the ISCP or like facilities, the term "SSP" has been used in the above description of the invention broadly to include the use of more simplified switches than are necessary for use in the conventional processing of the full range of AIN calls.

In this disclosure there is shown and described only the preferred embodiments of the invention and but a few examples of its versatility. It is to be understood that the invention is capable of use in various other combinations and environments and is capable of changes or modifications within the scope of the inventive concept as expressed herein.

What is claimed is:

1. In a telephone communication network including a plurality of central office switches, each of said central office switches connected to at least one local communication line associated with a telephone directory number, said network further comprising:

a voice network portion having voice communication paths for interconnecting any of the central office switches;

a common channel signaling data network portion having signaling paths interconnecting said central office switching systems through at least one signal Transfer Point (STP);

and a database accessed through said common channel signaling data network portion and residing remote from said central office switches, said data base including;

a translation table in said database having a structure in which telephone directory numbers are correlated with point codes that identify said central office switch locations in said common channel signaling data network portion, whereby translations of dialed directory numbers to point codes occur at the remote database.

2. A network as recited in claim 1, wherein said structure comprises correlation among area codes, exchange codes and central office switches.

3. A network as recited in claim 1, wherein said structure further comprises correlation between telephone directory numbers and line equipment in identified central office switches, whereby said database contains sufficient information to identify routing of a dialed call from an originating local communication line to a destination local communication line through the voice network portion.

4. A network as recited in claim 1, wherein said telephone communication network is an Advanced Intelligent Network (AIN) and said database resides in an Integrated Services Control Point (ISCP).

5. In a public switched telephone network comprising a plurality of subscriber telephone lines, each assigned a telephone directory number and coupled to an associated telephone switching facility, a method for routing telephone calls placed to said network comprising the steps of:

receiving, at an originating telephone switching facility, signals representing dialed digits of a telephone call placed from a calling line associated with said originating telephone facility;

communicating data corresponding to said dialed digits from said originating telephone switching facility to a database remote from said originating switching facility;

translating said transmitted data at said database to point code information identifying a terminating telephone switching facility associated with a called line that is assigned a telephone directory number comprising said dialed digits; and completing a voice path connection between said originating telephone switching facility and said terminating telephone switching facility in response to said translating step.

6. A method as recited in claim 5, wherein said translating step comprises correlating an exchange code in said dialed digits with said terminating telephone switching facility.

7. A method as recited in claim 5, wherein said completing step comprises identifying at least one trunk connection between the originating telephone switching facility and the terminating switching facility.

8. A method as recited in claim 5, further comprising the step of identifying, at said database, office equipment at the terminating switching facility that is connected to said called line and said completing step further comprises bridging the voice path connection to the identified office equipment.

9. A method as recited in claim 8, wherein said completing step further comprises:

sensing an idle condition at said called line;

applying ringing signals to said called line;

sensing an off-hook condition on said called line subsequent to said applying step; and coupling at least one interoffice trunk in the voice path connection in response to the sensed off-hook condition.

10. A method as recited in claim 9, further comprising the steps of:

timing the call at the ISCP, said timing being initiated in response to said coupling step and being concluded in response to an on hook condition in the voice path connection; and generating billing data for the call at the ISCP on the basis of the length of the call determined in said timing step.

11. A method as recited in claim 5, wherein said communicating step comprises:

temporarily suspending processing of the placed call in response to an off-hook trigger at the originating telephone switching facility;

collecting said dialed digits; and transmitting said data in a common channel signaling network.

12. A method as recited in claim 11, wherein said communicating step further comprises transmitting data representing the calling subscriber telephone line.

13. A method as recited in claim 5, wherein said originating telephone switching facility is the same as said terminating telephone switching facility.

14. In a telephone communication network including a plurality of interconnected central office switching systems comprising respective Service Switching Points (SSPs), each connected by office equipment to at least one local subscriber line associated with a telephone directory number, a voice network portion comprising voice communication paths for interconnecting any of the central office switching systems, a common channel signaling network portion comprising signaling paths interconnecting said central office switching systems through at least one Signal Transfer Point (STP) and an Integrated Services Control Point (ISCP), a method for processing telephone calls comprising:

sensing an off-hook condition of a calling telephone line at an originating central office connected thereto;

providing dial tone from said originating central office to said calling telephone line in response to the sensed off-hook condition;

receiving at said originating central office dialed signals for a telephone call from said calling telephone line;

collecting dialed digits from the dialed signals;

transmitting data, representing said dialed digits and the office equipment assigned to said calling telephone line at said originating office, from said originating office to said ISCP via an STP in said common channel signaling network;

translating the data received by the ISCP in said transmitting step to the point code and equipment number for a terminating office and a called subscriber line connected thereto;

sending, via the common channel signaling network, the data translated in said translating step to an STP; and routing the call through the voice network portion in response to the data received by said STP in said sending step.

15. A method as recited in claim 14, wherein said completing step comprises:

determining whether said called subscriber line is in an idle status;

in response to a determination of idle status in said determining step, sending ringing signals from said terminating central office to said called subscriber line and sending ringback signals from said originating central office to said calling subscriber line; and in response to a subsequent off-hook condition in said called subscriber line, completing a trunk path connection between the office equipment for said calling subscriber line at said originating central office to the office equipment for said called subscriber line at said terminating central office.

16. A method as recited in claim 15, further comprising the steps of:

transmitting a routing completion message to said ISCP via said common channel signaling network portion in response to completing said trunk path;

initiating timing of the call at the ISCP in response to receipt therein of said routing completion message;

transmitting a call termination message to said ISCP via said common channel signaling network portion in response to a subsequent on-hook condition on either called or calling subscriber line;

ceasing timing of the call at the ISCP in response to receipt therein of said call termination message; and generating billing data for the call at the ISCP on the basis of the length of time of the call.

17. A method as recited in claim 15, wherein in response to a determination of busy status in said determining step, further comprising the step of sending a busy data message from said terminating central office to the ISCP via an STP in said common channel signaling network portion.

* * * * *